(12) United States Patent
Hattori et al.

(10) Patent No.: US 12,199,508 B2
(45) Date of Patent: Jan. 14, 2025

(54) POWER SUPPLY DEVICE FOR VEHICLE

(71) Applicant: IMASEN ELECTRIC INDUSTRIAL CO., LTD., Aichi (JP)

(72) Inventors: Makoto Hattori, Aichi (JP); Koichi Yamanoue, Aichi (JP)

(73) Assignee: IMASEN ELECTRIC INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 18/549,433

(22) PCT Filed: Mar. 28, 2022

(86) PCT No.: PCT/JP2022/014838
§ 371 (c)(1),
(2) Date: Sep. 7, 2023

(87) PCT Pub. No.: WO2022/224718
PCT Pub. Date: Oct. 27, 2022

(65) Prior Publication Data
US 2024/0146189 A1 May 2, 2024

(30) Foreign Application Priority Data
Apr. 19, 2021 (JP) ................................. 2021-070586

(51) Int. Cl.
*H02M 3/155* (2006.01)
*B60L 53/20* (2019.01)
*H02M 1/00* (2006.01)

(52) U.S. Cl.
CPC ............ *H02M 3/155* (2013.01); *B60L 53/20* (2019.02); *B60L 2210/12* (2013.01); *H02M 1/0054* (2021.05)

(58) Field of Classification Search
CPC ..... H02M 3/155; H02M 1/0054; B60L 53/20; B60L 2210/12
(Continued)

(56) References Cited

U.S. PATENT DOCUMENTS 10,960,775 B2 * 3/2021 Satake ................. B60L 3/0092
2010/0101875 A1 * 4/2010 Maeda .................... B60L 3/003
307/9.1
(Continued)

FOREIGN PATENT DOCUMENTS

| JP | 2006-352959 A | 12/2006 |
| JP | 2018-026973 A | 2/2018 |
| JP | 2019-205321 A | 11/2019 |

OTHER PUBLICATIONS

International Search Report dated Jun. 14, 2022, for the corresponding patent application No. PCT/JP2022/014838, with English translation.
(Continued)

*Primary Examiner* — Alfonso Perez Borroto
(74) *Attorney, Agent, or Firm* — LUCAS & MERCANTI, LLP

(57) ABSTRACT

A configuration that converts power from high voltage to low voltage by selectively connecting a predetermined storage element group to a low voltage electrical load from a high voltage power supply formed by connecting storage elements in series. In this configuration, the number of storage elements is set such that the voltage of each storage element group is slightly higher than the rated operating voltage of the low voltage electrical load means when the voltage of the storage elements is at its lowest. Along with this, a rectifying means and a smoothing circuit composed of an inductor and a capacitor are provided on the output side of the switching means to control the ratio of ON time and OFF time (dead time) of the switching means. As a result, a stable low-voltage power supply is constructed without being affected by changes in the voltage (SOC) of the storage element.

4 Claims, 6 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 2010/0102627 A1* | 4/2010 | Abe ................... | H01M 10/613 |
| | | | 307/43 |
| 2010/0193266 A1* | 8/2010 | Seo ..................... | H02J 7/00309 |
| | | | 307/9.1 |

OTHER PUBLICATIONS

Notice of Reasons of Refusal, dated Oct. 22, 2024, issued for the corresponding Japanese Patent Application No. 2021-070586, 8 pages, with English translation.

* cited by examiner

POWER SUPPLY DEVICE FOR VEHICLE

CROSS REFERENCE TO RELATED APPLICATION

This Application is a 371 of PCT/JP2022/014838 filed on Mar. 28, 2022, which, in turn, claims priority of Japanese Patent Application No. 2021-070586 filed on Apr. 19, 2021, and the above applications are incorporated herein by reference.

TECHNICAL FIELD

The present invention relates to a power supply device mounted on a vehicle. The power supply device includes a high-voltage power storage means particularly used for vehicle traveling and the like, and a low-voltage power supply for supplying an electric load other than that for a vehicle traveling. The power supply device is configured to obtain the low voltage power supply from the high-voltage power storage means via a step-down means.

BACKGROUND ART

As the power supply device, a power supply device for the vehicle according to the proposal of the present applicant is known (Patent Publication (1)). In this power supply device for the vehicle, the high voltage power supply is formed by connecting power storage elements in series. The power supply device for the vehicle performs power conversion from a high voltage to a low voltage by selectively connecting a predetermined power storage element group to a low voltage electric load. The power supply device for the vehicle switches the power storage element group at high speed to make the switching loss of the switching means almost zero.

PRIOR ART PUBLICATION

Patent Publication

Patent Publication (1): Japanese Laid-Open Patent Publication No. 2018-26973

SUMMARY OF THE INVENTION

Problem(s) to be Solved by the Invention

A lithium-ion secondary battery is generally employed as the storage element of the vehicle high-voltage storage means. In this case, the usable range of SOC (State Of Charge) of the battery is about 30% to 80%. Accordingly, the single cell voltage of the lithium ion secondary battery changes from about 2.6V to about 3.6V. When the number of single cells in the storage element group is 4, the group voltage varies from 2.6V×4=10.4V to 3.6V×4=14.4V. In addition, it is known that there is a voltage drop caused by the product of the current consumption of the low-voltage electric load and the internal resistance of the storage element.

Low-voltage electrical loads of vehicles include lighting devices using incandescent lamps, wiper mechanisms using DC motors, and the like. These low-voltage electrical loads change their operating states according to the operating voltage, such as changes in the brightness of lights and changes in the operating speed of wipers. In the power supply device for the vehicle of Patent Document 1, when the voltage of the high-voltage storage means and the current consumption of the low-voltage electric load change, the voltage of the low-voltage power supply changes accordingly. Patent document 1 has a problem that the operation state of the low-voltage electric load is not stable.

The present invention has been made in view of the above problems. This power supply device for the vehicle is mounted on a vehicle and obtains a low voltage power supply from a high voltage power supply through a step-down means. Provided is a power supply device for the vehicle capable of obtaining a stable low voltage with a simple configuration even if the voltage of a storage element constituting a high voltage power supply and the current consumption of a low voltage electric load change.

Solution(s) to the Problem(s)

The present invention according to the first embodiment is a power supply device for a vehicle, comprising:
an electric load means that operates at a low voltage; a high-voltage power supply that provides a high-voltage DC power supply by connecting in series a plurality of power storage elements; and a step-down means for stepping down a voltage of the high-voltage power supply to obtain a low-voltage DC power supply, wherein a voltage value of the low-voltage DC power supply is a rated operating voltage of the electrical load means.

Said step-down means comprises a switching means,
when a voltage value of the power storage element is a lowest value of a use range, at each node of the plurality of power storage elements connected in series,
said switching means acts to select single/or multiple nodes so that a voltage is substantially equal to the rated operating voltage of the electrical load means.

Said step-down means includes a rectifying means connected to the switching means; and a known smoothing circuit that is connected in parallel with the rectifying means, wherein the smoothing circuit comprises an inductor and a capacitor. Both ends of the capacitor are configured to supply the low-voltage DC power source to said electrical load means.

The high-voltage power supply that provides a high-voltage DC power supply by connecting in series a plurality of power storage elements. A voltage value of said high-voltage power supply is N times a voltage of said low-voltage DC power supply (N is a natural number), and a number of the storage elements is N×n (n is a natural number).

Said step-down means comprises a control means. The control means acts to cyclically change a location of the single/or multiple nodes that the switching means selects from among the plurality of power storage elements.

The control means acts to provide a so-called dead time during which connections between all the nodes and said rectifying means are cut off when changing the location of the node selected by the switching means.

The control means acts to vary a ratio between a time for selectively connecting the single/or multiple nodes and the dead time.

The present invention according to the second embodiment is a power supply device for a vehicle,
wherein said control means acts to change the ratio between the time for selectively connecting the single/or multiple nodes and the dead time according to voltage values of said single/or plurality of nodes.

The present invention according to the third embodiment is a power supply device for a vehicle, wherein said control means acts to change the ratio between the time for selectively connecting the single/or multiple nodes and the dead time according to the voltage value of said high-voltage power supply.

The present invention according to the fourth embodiment is a power supply device for a vehicle, wherein said control means provides a feedback control of the ratio of the time for selectively connecting the single/or multiple nodes and the dead time so that a difference between the voltage value of the low voltage DC power supply and the rated operating voltage of said electrical load means is minimized.

Effect(s) of the Invention

The power supply device for the vehicle in the first embodiment, when the voltage value of the storage element is the lowest of the usable range, the voltage value of the single/or multiple nodes selectively connected by the switching means is substantially equal to the rated voltage value of the electric load means. Even when the voltage of the storage element is at its lowest value, it is possible to obtain a low power supply voltage equal to or higher than the rated operating voltage of the electric load means.

Furthermore, the power supply device for the vehicle in the first embodiment, the control means changes the ratio between the time during which the single/or multiple nodes are selectively connected and the dead time, which the control means obtains a low-voltage DC power supply via the smoothing circuit which comprises the rectifying element, the inductor and the capacitor. It is possible to obtain the low-voltage DC power supply with an arbitrary voltage value regardless of the voltage of the storage element.

Furthermore, the power supply device for the vehicle in the first embodiment, when the voltage value of the storage element is at the lowest of the usable range, the voltage value of the single/or multiple nodes selectively connected by the switching means is substantially equal to the rated voltage value of the electric load means. Since the potential difference between the input and output of the switching means can be minimized, there is an effect that known switching losses can be minimized.

The power supply device for the vehicle in the second embodiment, said control means acts to change the ratio between the time during which the node is selectively connected and the dead time according to the voltage values of the single/or plurality of nodes. When the voltage value of the storage element becomes high, the switching means reduces the ratio of the time during which the node is selectively connected and the time during which the node is not connected (dead time) to perform a step-down operation. This makes it possible to keep the voltage value of the low-voltage DC power supply constant regardless of the voltage of the storage element.

The power supply device for the vehicle in the third embodiment, said control means acts to change the ratio between the time during which the node is selectively connected and the dead time according to the voltage value of the high voltage power supply. When the voltage value becomes high, the switching means reduces the ratio of the time during which the node is selectively connected and the time during which the node is not connected (dead time) to perform a step-down operation. This makes it possible to keep the voltage value of the low-voltage DC power supply constant regardless of the voltage value of the high-voltage power supply.

The power supply device for the vehicle in the fourth embodiment, said control means feedback-controls the ratio between the time during which the node is selectively connected and the dead time. Thereby, the control means minimizes the difference between the voltage value of the low-voltage DC power supply and the rated operating voltage of the electrical load means. This makes it possible to accurately maintain the voltage accuracy of a low-voltage DC power supply.

As described above, the power supply device for the vehicle of the present invention can stably operate various low-voltage electric load means without causing changes in the illuminance of lamps, operating forces of motor actuators, etc., or speed changes. This is an excellent effect.

MODE TO CARRY OUT THE INVENTION

Embodiment

Hereinafter, embodiments of the power supply device for the vehicle of the present invention will be described with reference to FIGS.

Figure 1:
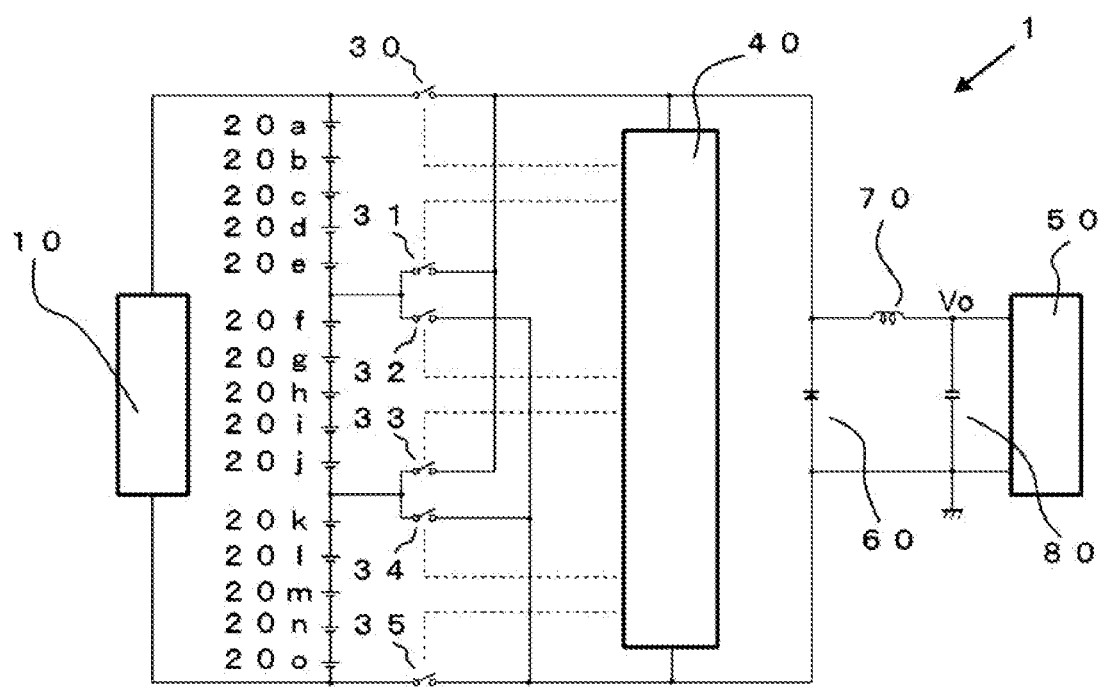
FIG. 1 is a diagram showing a basic configuration of a power supply device for the vehicle according to the present invention.

FIG. 1 is a basic embodiment of the present invention. A power supply device for the vehicle 1 includes a charging means 10 mounted on a vehicle and driven by an engine, power storage elements (20a to 20o) composed of secondary batteries charged by the charging means 10, switching means (30 to 35), and control means 40. an electric load means 50 operating at a rated voltage of 12 V, a rectifying means 60 having both ends connected to the switching means (30 to 35), and a smoothing circuit connected in parallel with the rectifying means 60 which the smoothing circuit comprises an inductor 70 and a capacitor 80. It acts as a low voltage DC power supply to supply voltage Vo to the electric load means 50.

The charging means 10 is driven by an engine (not shown) in order to supply necessary electric power to the vehicle electrical components. When the vehicle decelerates, the charging means 10 regenerates kinetic energy during deceleration via the drive system to charge the storage elements (20a to 20o).

Each node of the power storage element (20a to 20o) is, for example, a lithium-ion battery having a charging voltage of 3V. All the nodes of the power storage element (20a to 20o) are connected in series. Assuming that the multiple N of the rated operating voltage of the electric load means 50 of 12V is 3, a high voltage power supply with a total of 36V or more is formed. The high voltage power supply powers the electric drive control system. The electric drive control system is composed of an in-vehicle motor, an inverter (not shown), etc. The high voltage power supply acts to assist the driving torque of the engine. As a result, when the vehicle is power running, the energy regenerated during deceleration can be reused for traveling, so that it is possible to improve the traveling fuel efficiency of the vehicle.

In the power storage elements (20 to 20o), the nodes 20a to 20e are configured as the first group node, the nodes 20f to 20j are configured as the second group node, and the nodes 20k to 20o are configured as the third group node. The switching means 30 to 35 are connected to both ends of each group node. The total number of nodes of the power storage elements (20a to 20o) is N×n=15 in total by multiplying the multiple N=3 by the number n=5 in each group node.

A lithium-ion secondary battery is generally employed as the storage element of the vehicle high-voltage storage means. In this case, the usable range of SOC (State Of Charge) of the battery is about 30% to 80%. Accordingly, the single cell voltage of the lithium-ion secondary battery changes from about 2.6V to about 3.6V. Therefore, when the number of single cells in each group is 5, the group voltage changes from 2.6V×5=13V to 3.6V×5=18V.

In addition, since the storage element has a predetermined internal resistance, the current flowing through the storage element also reduces the single cell voltage. For example, when the internal resistance is 1 mΩ and the number of single cells is 5, when the current flowing through the electric load means 50 is 100 A, the minimum value of the group voltage drops to 13 V·100 A×(1 mΩ×5)=12.5 V.

As shown in FIG. 1, the control means 200 controls the ON/OFF state of the switching means (30 to 35).

Figure 2:
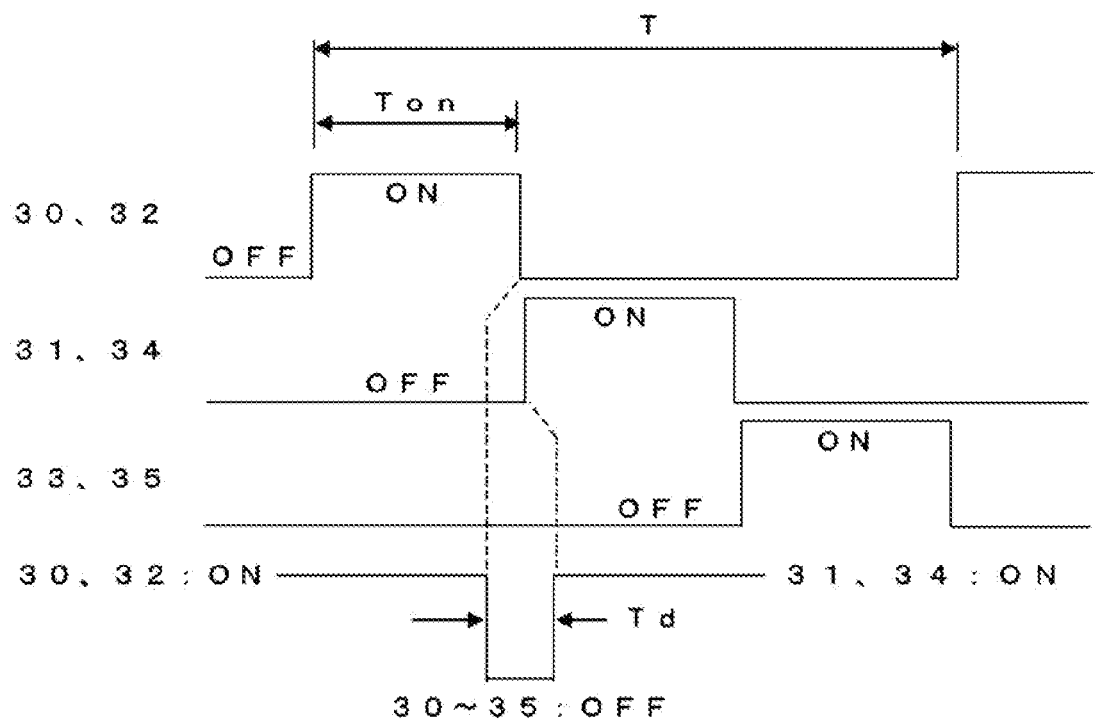
FIG. 2 is a timing chart showing the operation of the power supply device for the vehicle according to the present invention.

As shown in FIG. 1, the control means 40 turns on the switching means (30, 32) and connects the rectifying means 60 and the first group node of the power storage element for period [Ton] shown in FIG. 2. At this time, the switching means (31, 34, 33, 35) are turned off. The switching means 30 is connected to the positive electrode side of the first group node, and the switching means 32 is connected to the negative electrode side of the first group node. Therefore, during period [Ton], the DC voltage of each group is applied to the rectifying means 60 with the cathode side as +.

Incidentally, it is desirable that the period [Ton] is, for example, about 50 microseconds.

Next, the control means 40 keeps all the above-mentioned switching means (30 to 35) OFF during the period [Td] shown in FIG. 2. The reason why the period [Td] is provided is that, for example, when the switching means 30 and the switching means 31 are turned on at the same time, an excessive current flows in the closed circuit. The closed circuit is formed by the switching means 30, the switching means 31, and the power storage element (20a,20b,20c,20d,20e). This is because the switching means may be damaged or the charging power of each power storage element may be wasted.

In said first group, the control means 40 turns ON the switching means 30, 32 for the period [Ton] to supply the voltage of the first group to the rectifying means 60, the inductor 70 and the capacitor 80; Subsequently, when all the switching means 30 to 35 are turned off during the period [Td], the current in the inductor 70 flows through the capacitor 80 and the rectifying means 60 in the forward direction.

In said second group, the control means 40 turns ON the switching means 31, 34 for the period [Ton] to supply the voltage of the second group to the rectifying means 60, the inductor 70 and the capacitor 80; Subsequently, when all the switching means 30 to 35 are turned off during the period Td, the current in the inductor 70 flows through the capacitor 80 and the rectifying means 60 in the forward direction.

In said third group, the control means 40 turns ON the switching means 33, 35 for the period [Ton] to supply the voltage of the third group to the rectifying means 60, the inductor 70 and the capacitor 80; Subsequently, when all the switching means 30 to 35 are turned off during the period Td, the current in the inductor 70 flows through the capacitor 80 and the rectifying means 60 in the forward direction. By operating as described above, the above is repeated with period T, as one cycle shown in FIG. 2.

As a result, the output voltage Vo as a low-voltage DC power supply is Vo=voltage of each group×Ton/(Ton+Td), that is, Vo=group voltage×ON duty.

The rated operating voltage of the electrical load means 50 is typically 12V. Therefore, according to the above configuration, even when the voltage of the storage element is the lowest value, the voltage of each group is 12.5 V. If the ON duty is set to 96%, a rated operating voltage of 12V or higher for the electric load means 50 can be obtained.

The control means 40 reduces the ON duty to maintain the output voltage Vo as a low-voltage DC power supply at the rated operating voltage of the electric load means 50 when the voltage of the storage elements 20a to 20o rises.

Figure 3:
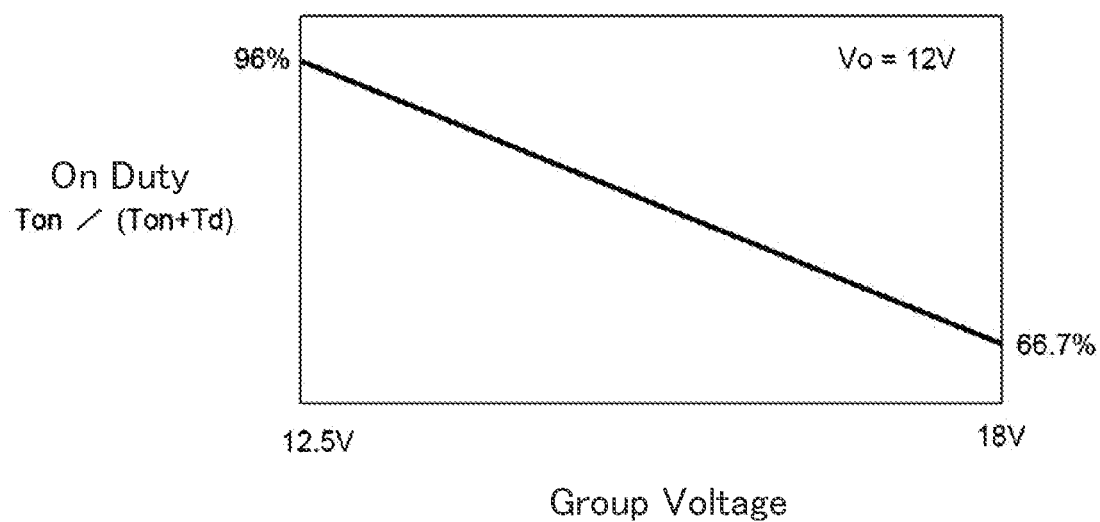
FIG. 3 is a diagram that represents the duty of the group voltage and switching means.

Specifically, as shown in FIG. 3, when the group voltage is 12.5V, the control means sets the ON duty to 96%, and when the group voltage is 18V, the control means sets the ON duty to 66.7%. Then, the output voltage Vo as a low-voltage DC power supply is maintained at 12 V regardless of the value of the group voltage. In this way, the control means can keep the value of Vo constant by continuously changing the ON duty with respect to changes in the group voltage.

The control means 40 monitors the voltage across the rectifying element 60 when the switching means 30 to 35 select one of the groups, and measures the voltage of each group.

Alternatively, the control means 40 may input the series voltage of the storage elements 20a to 20o, that is, the voltage value of the high-voltage power supply, and change the ON duty according to the voltage.

As described above, the vehicle power supply device of the present invention selectively connects a predetermined storage element group to a low-voltage electric load from a high-voltage power supply formed by connecting storage elements in series. Thereby, power conversion from high voltage to low voltage is performed. In the configuration, each storage element group voltage is set to a number of storage elements that is slightly higher than the rated operating voltage of the low voltage electrical load means when the storage element voltage is at its lowest. Along with this, a rectifying means and a smoothing circuit composed of an inductor and a capacitor are provided on the output side of the switching means to control the ratio of ON time and OFF time (dead time) of the switching means. This makes it possible to make the voltage value of the low-voltage power supply approximately equal to the rated value of the electrical load means without being affected by changes in the voltage of the storage element.

Figure 4:
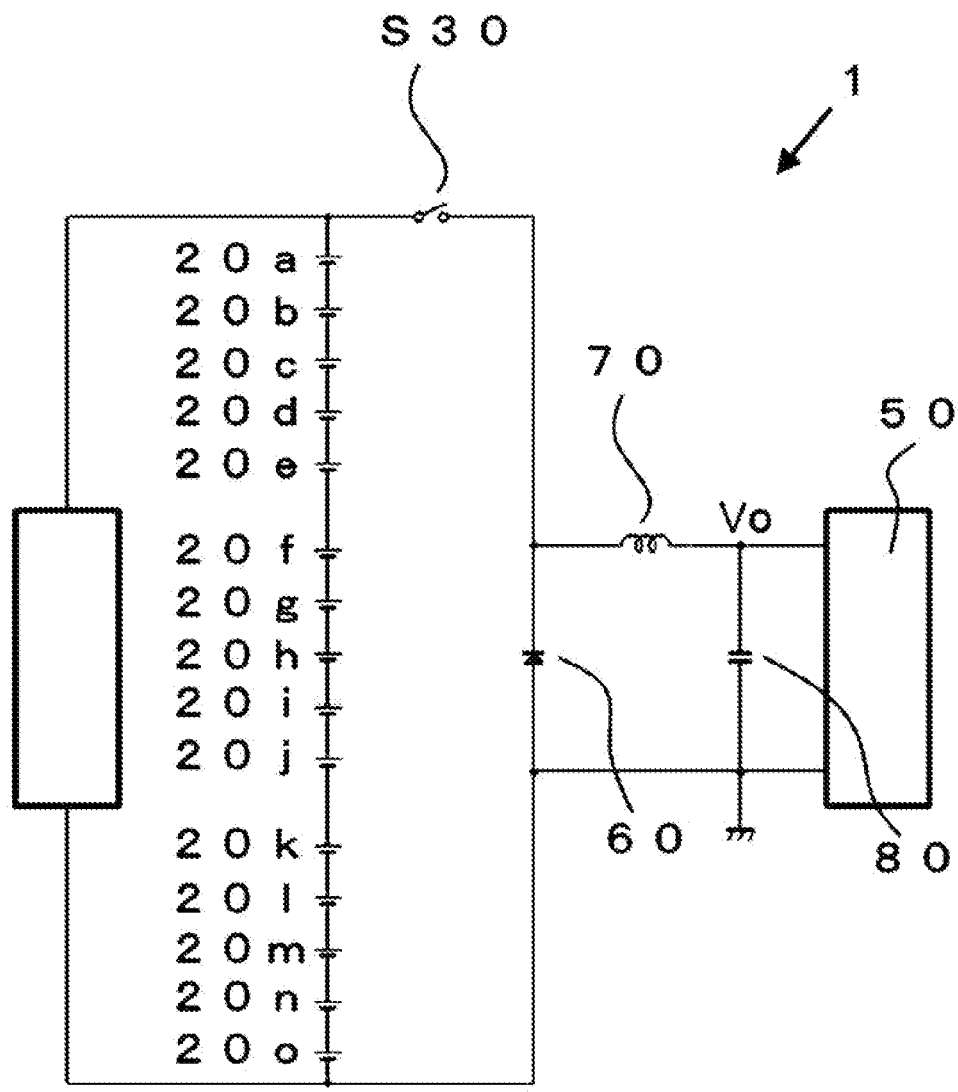
FIG. 4 is a diagram that represents the configuration of a general step-down means.

By the way, as a method of obtaining a low-voltage DC power supply from a high-voltage DC power supply, it is common to use a known step-down converter shown in FIG. 4.

In FIG. 4, a high-voltage power supply composed of storage elements 20a to 20o in series is switched on and off by switching means S30, and supplied to a rectification and smoothing circuit by rectification means 60, inductor 70, and capacitor 80. Along with this, the stepped-down voltage Vo of the low-voltage power supply is controlled by controlling the ON/OFF ratio of the switching means S30.

Figure 5:
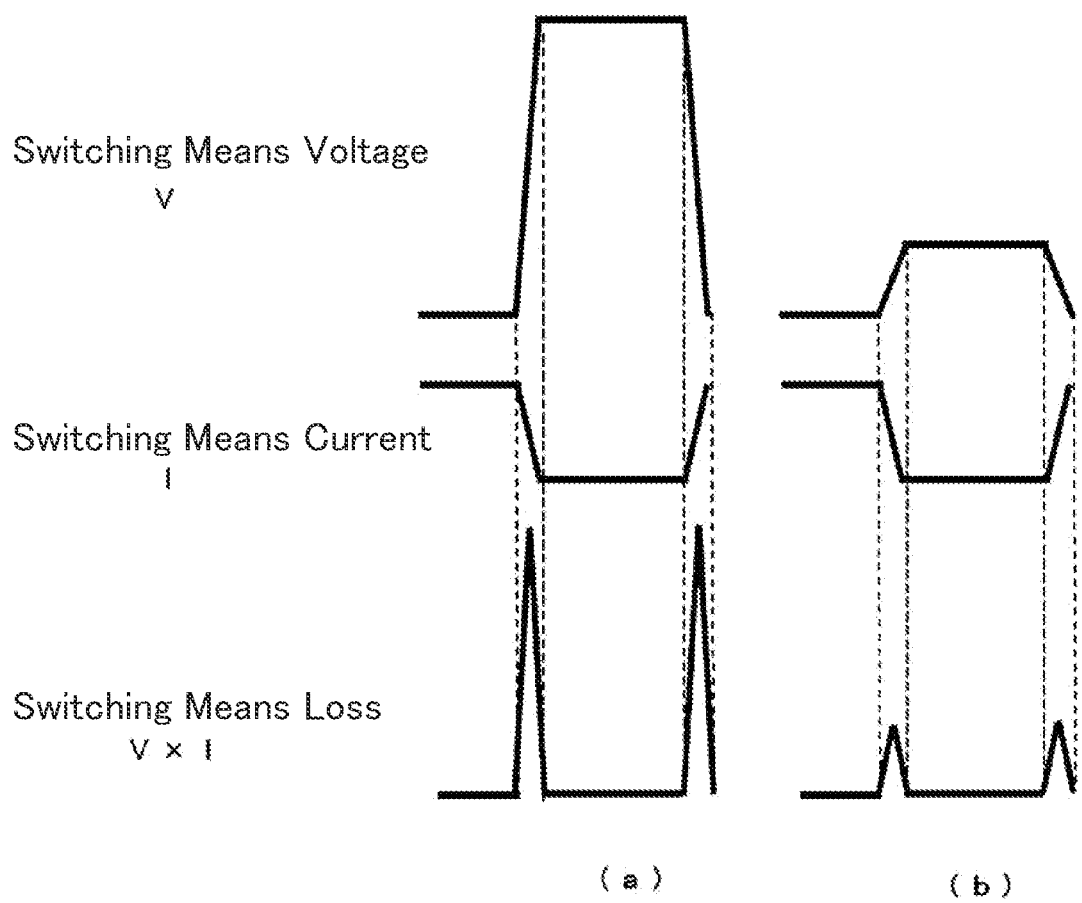
FIG. 5 is a diagram comparing the power loss of the general step-down means with the power loss of the present invention.

Here, the operation of the step-down means of the present invention and the operation of the step-down converter are compared in FIG. 5. The voltage V applied to the switching means, the current I flowing through the switching means, and the loss V×I of the switching means generate a large power loss as shown in (a) in the step-down converter. On the other hand, since the step-down means of the present invention minimizes the voltage value of the storage element group, power loss is reduced as shown in (b). As a result, power conversion efficiency can be increased.

Next, another embodiment of the vehicle power supply device of the present invention will be described with reference to FIG. 6. It should be noted that the description of the constituent elements having the same reference numerals as those in FIG. 1 referred to in the above-described embodiment, explanation thereof, is omitted because there is no difference in their functions.

Figure 6:
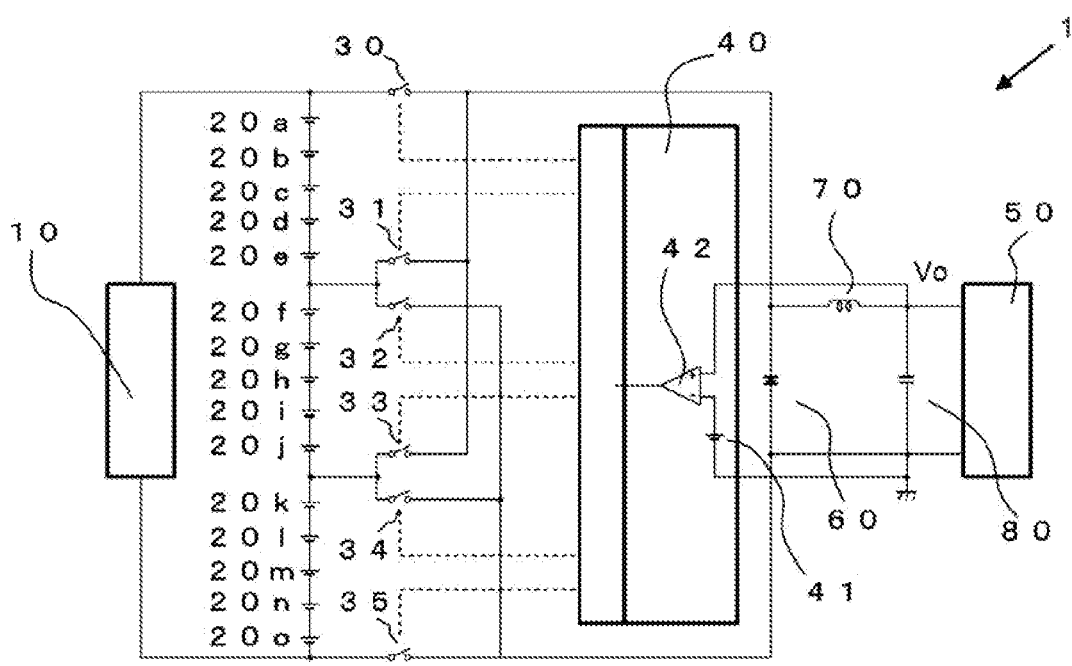
FIG. 6 is a diagram showing other embodiments of the power supply device for the vehicle of the vehicle of the present invention.

1 in FIG. 6 is the vehicle power supply device in this embodiment, and the control means 40 has a differential amplifier 42. The differential amplifier 42 compares the voltage Vo of the low-voltage DC power supply with the reference voltage 41, and controls the ON duty of the switching means 30-35 so that the difference between them becomes small.

The reference voltage 41 is set to 12 V, which is the rated operating voltage of the electrical load means 50. The reference voltage 41 can match the voltage value Vo of the low-voltage power supply to the rated value of the electric load means 50 with high accuracy without being affected by changes in the voltage of the storage elements 20a to 20o.

As described above, the present invention relates to a vehicle power supply apparatus that obtains a low voltage power supply from a high voltage power supply via a step-down means mounted on a vehicle. The power supply device for vehicle can obtain a stable low voltage with a simple configuration even if the voltage of the storage element constituting the high voltage power supply changes.

In the embodiment of the present invention, only a limited configuration and operation are shown as examples. For example, although the rectifying means has been described as a diode, the rectifying means may be a known synchronous rectification circuit using a MOSFET. The number of power storage elements connected in series, the type of power storage element, the element type and configuration of the switching means, the type of the cutoff means, the number of the cutoff means, location of the cutoff means and the operation timing of the control means can take any form.

DESCRIPTION OF NUMERICAL REFERENCES

1 power supply device for vehicle
10 charging means
20A to 20O power storage means
30 to 35 switching means
40 control means
50 electrical load means

The invention claimed is:

1. A power supply device for a vehicle, comprising:
an electric load means that operates at a low voltage;
a high-voltage power supply that provides a high-voltage DC power supply by connecting in series a plurality of power storage elements; and
a step-down means for stepping down a voltage of the high-voltage power supply to obtain a low-voltage DC power supply;
wherein
a voltage value of the low-voltage DC power supply is a rated operating voltage of the electrical load means,
said step-down means comprises a switching means,
when a voltage value of the power storage element is a lowest value of a use range, at each node of the plurality of power storage elements connected in series, said switching means acts to select single/or multiple nodes so that a voltage is substantially equal to the rated operating voltage of the electrical load means,
said step-down means includes:
a rectifying means connected to the switching means; and
a known smoothing circuit that is connected in parallel with the rectifying means,
wherein the smoothing circuit comprises an inductor and a capacitor,
both ends of the capacitor are configured to supply the low-voltage DC power source to said electrical load means,
a voltage value of said high-voltage power supply is N times a voltage of said low-voltage DC power supply (N is a natural number), and a number of the storage elements is N×n (n is a natural number),
said step-down means comprises a control means,
the control means acts to cyclically change a location of the single/or multiple nodes that the switching means selects from the plurality of storage elements,
the control means provides a so-called dead time during which connections between all the nodes and said rectifying means are cut off when changing the location of the node selected by the switching means,
the control means acts to vary a ratio between a time for selectively connecting the single/or multiple nodes and the dead time.

2. The power supply device for the vehicle according to claim 1, wherein
said control means acts to change the ratio between the time for selectively connecting the single/or multiple nodes and the dead time according to voltage values of said single/or plurality of nodes.

3. The power supply device for the vehicle according to claim 1, wherein
said control means acts to change the ratio between the time for selectively connecting the single/or multiple nodes and the dead time according to the voltage value of said high-voltage power supply.

4. The power supply device for the vehicle according to claim 3, wherein
said control means provides a feedback control of the ratio of the time for selectively connecting the single/or multiple nodes and the dead time so that a difference between the voltage value of the low voltage DC power supply and the rated operating voltage of said electrical load means is minimized.

* * * * *